US008403539B2

(12) United States Patent
Lee et al.

(10) Patent No.: US 8,403,539 B2
(45) Date of Patent: Mar. 26, 2013

(54) LIGHT GUIDE FOR IMPROVING DEVICE LIGHTING

(75) Inventors: Hsin Chin Lee, Waterloo (CA); Antanas Matthew Broga, Cambridge (CA)

(73) Assignee: Research In Motion Limited, Waterloo (CA)

(*) Notice: Subject to any disclaimer, the term of this patent is extended or adjusted under 35 U.S.C. 154(b) by 352 days.

(21) Appl. No.: 12/713,424

(22) Filed: Feb. 26, 2010

(65) Prior Publication Data

US 2011/0210921 A1    Sep. 1, 2011

(51) Int. Cl.
*F21V 5/02* (2006.01)

(52) U.S. Cl. .................. 362/339; 362/337; 362/330

(58) Field of Classification Search ........... 362/339, 362/330, 337, 85, 615, 620, 626, 602, 619, 362/625
See application file for complete search history.

(56) References Cited

U.S. PATENT DOCUMENTS

| | | | |
|---|---|---|---|
| 3,880,528 A | 4/1975 | Petersen et al. | |
| 5,627,926 A | 5/1997 | Nakamura et al. | |
| 6,256,007 B1 | 7/2001 | Walukas et al. | |
| 6,310,609 B1 | 10/2001 | Morgenthaler | |
| 6,798,395 B1 | 9/2004 | Yamauchi et al. | |
| 7,452,118 B2 * | 11/2008 | Tsuchiya | 362/608 |
| 7,525,126 B2 | 4/2009 | Leatherdale et al. | |
| 2003/0127583 A1 | 7/2003 | Bechtel et al. | |
| 2005/0180169 A1 | 8/2005 | Saitoh et al. | |
| 2005/0201101 A1 * | 9/2005 | Shimura | 362/330 |
| 2007/0012350 A1 | 1/2007 | Kim et al. | |
| 2007/0019433 A1 | 1/2007 | Lowles | |
| 2007/0127268 A1 | 6/2007 | Chen | |
| 2007/0176081 A1 | 8/2007 | Stricklin | |
| 2008/0137004 A1 | 6/2008 | Iwasaki et al. | |
| 2008/0252823 A1 | 10/2008 | Hwang et al. | |
| 2009/0027588 A1 | 1/2009 | Medendorp, Jr. et al. | |
| 2009/0096937 A1 | 4/2009 | Bauer et al. | |
| 2009/0273949 A1 | 11/2009 | Tseng et al. | |

FOREIGN PATENT DOCUMENTS

| | | |
|---|---|---|
| DE | 4406906 A1 | 9/1995 |
| EP | 1329664 A1 | 7/2003 |
| EP | 1696259 A1 | 8/2006 |
| EP | 2053430 A2 | 4/2009 |
| JP | 61130828 A | 7/1986 |
| JP | 07114025 A | 5/1995 |
| JP | 2005070065 A | 3/2005 |
| WO | 2009034515 A2 | 3/2009 |

OTHER PUBLICATIONS

European patent application No. 09 164 071.4 Examination Report dated May 31, 2011.
European Patent Application No. 10154967.3 Search Report dated Sep. 3, 2010.

(Continued)

*Primary Examiner* — Bao Q Truong
(74) *Attorney, Agent, or Firm* — Perry + Currier Inc.; Kristjan Spence

(57) ABSTRACT

A light guide guides light from a light emitter that is adjacent to an aperture of an electronic device. The light is eventually emitted from the aperture, to thereby provide lighting. The light guide can include a plurality of prisms which can thereby permit reduction in the overall thickness of the electronic device.

18 Claims, 12 Drawing Sheets

OTHER PUBLICATIONS

A novel highly integrated light guide plate using micro optical technique Xu, P., et al. "A novel highly integrated light guide plate using micro optical technique", Proc. SPIE, vol. 6834, pp. 683409 (2008) http://adsabs.harvard.edu/abs/2008SPIE.6834E...8X.

IOPscience, Novel integrated light-guide plates for liquid crystal display backlight, downloaded from www.iop.org/EJ/abstract/1464-4258/7/3/003, Aug. 4, 2010.

European Search Report, Nov. 19, 2009.

Related European Patent Application No. 12179390.5 Search Report dated Aug. 29, 2012.

Related European Patent Application No. 09164071 A Examination Report dated Aug. 30, 2012.

* cited by examiner

LIGHT GUIDE FOR IMPROVING DEVICE LIGHTING

FIELD

The present specification relates generally to lighting technologies and more particularly relates to a light guide for providing lighting to an electronic device.

BACKGROUND

Portable electronic devices, cellular telephones and other devices frequently include a display as well as one or more input devices. Low light conditions, however, can dramatically impact device usability, particularly where the emitted light from the display can make it difficult or impossible to see an input device near that display. To compensate for low light conditions, small lights may be included so as to light the input device.

BRIEF DESCRIPTION OF THE DRAWINGS

The following Figures show certain exemplary embodiments.

DETAILED DESCRIPTION

This specification pertains to light guides that direct light generated by a light emitter for emission from an electronic device. For example, in an electronic device having an input device such as a keyboard or keypad, the light guide directs light from the emitter towards an aperture associated with an input device. As will be discussed further below, the aperture can be any structure that defines an opening, or a window, or transparent material, or translucent material, or any other structure by which the light may issue from the electronic device. In one illustrative embodiment, an aperture may be an illuminated key of a keyboard. The illumination of the key comes from light generated by the light emitter and directed to the key by the light guide.

Figure 1:
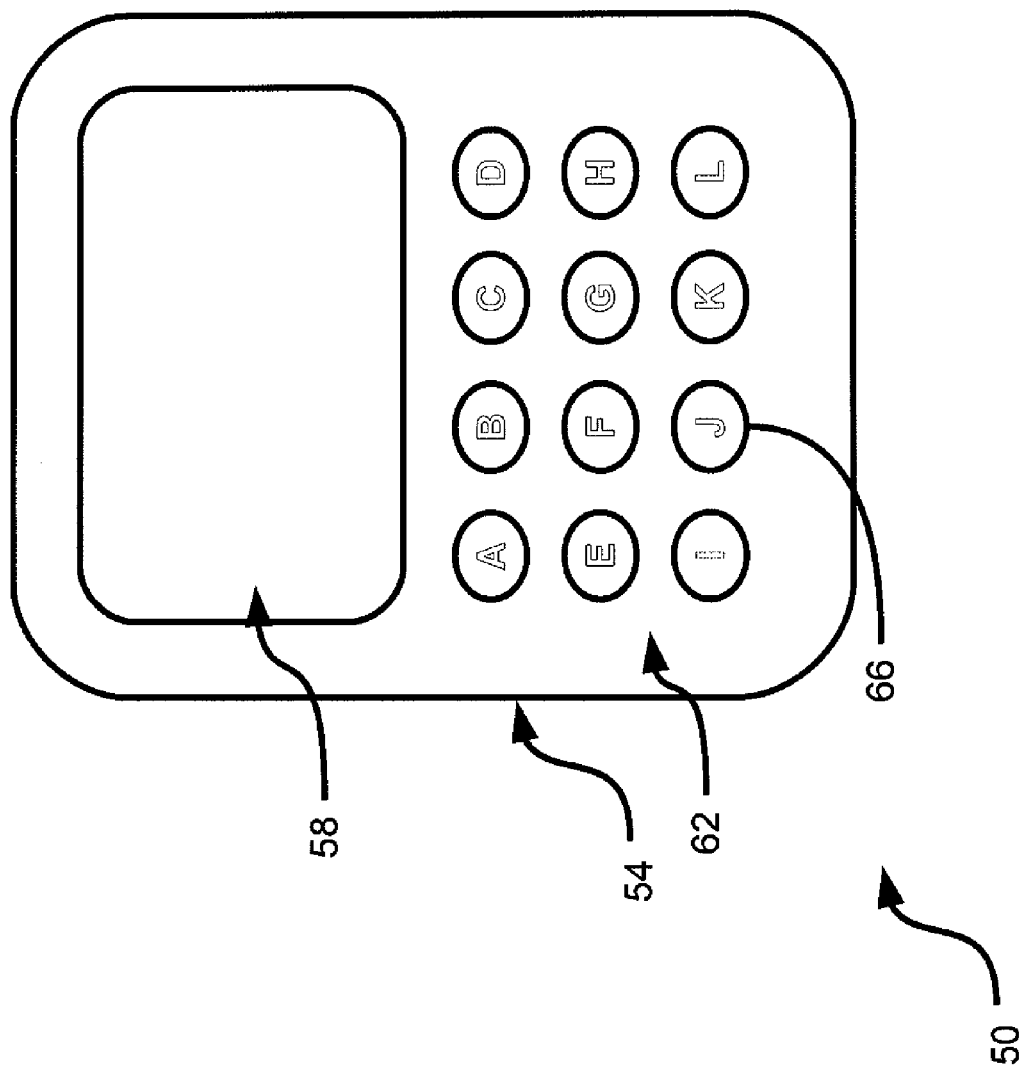
FIG. 1 is a front view of a non-limiting example of a portable electronic device to which light guides according to the present specification can be applied.

FIG. 1 shows a schematic representation of a non-limiting example of a portable electronic device 50 to which light guides, as discussed in greater detail below, can be applied. It is to be understood that portable electronic device 50 is purely exemplary, and it will be apparent to those skilled in the art that a variety of different portable electronic device structures are contemplated. Indeed variations on portable electronic device 50 can include, without limitation, a cellular telephone, a handheld remote control unit, a garage door opener, a portable email paging device, a camera, a portable music player, a portable video player, a portable video game player and a handheld global positioning system (GPS) device. Other contemplated variations include devices which are not necessarily portable, such as keyboards for desktop computers, video game control pads and traditional telephone handsets.

Device 50 comprises a chassis 54 that supports a display 58. Display 58 can comprise one or more light emitters such as an array of light emitting diodes (LED), liquid crystals, plasma cells, or organic light emitting diodes (OLED). Other types of light emitters are contemplated. In general, display 58 can be any kind of apparatus for displaying visual information. Display 58 is typically controlled by one or more processing units (not shown) supported within chassis 54. It should be understood that other types of electronic devices which do not include displays and which can utilize the light guides discussed herein are contemplated, and accordingly, display 58 is optional for implementing light guides as discussed herein.

Device 50 also comprises a keyboard 62. Keyboard 62 comprises a plurality of keys 66. For ease of explanation, only the key bearing the letter "J" is indicated with reference 66 in FIG. 2. Also for ease of explanation, device 50 is shown as only having twelve keys, labeled "A" through "I". However, it is to be understood that this specification is not limited to any particular structure, spacing, pitch or shape of keyboard 62, and the depiction in FIG. 1 is purely exemplary. For example, full or reduced "QWERTY" keyboards are contemplated. As another example, numeric keyboards as commonly employed on telephones or handheld remote control units are also contemplated. Other types of keyboards are contemplated. It is also to be understood that while the present embodiment is directed to lighting of a keyboard, such as keyboard 66, the present specification also contemplates the lighting of other components, such as touch-pads, joysticks, trackballs, track-wheels, keypads, instrument panels in aircraft or other vehicles, a backlight for a display, and any other component of electronic devices that includes lighting so that the electronic device can be seen in low-light environments. It is also to be understood that light guides can be applied to other, more general lighting applications associated with apertures on electronic devices, such as illuminated labels, symbols or indicator lights not associated with a particular input device.

Figure 2:
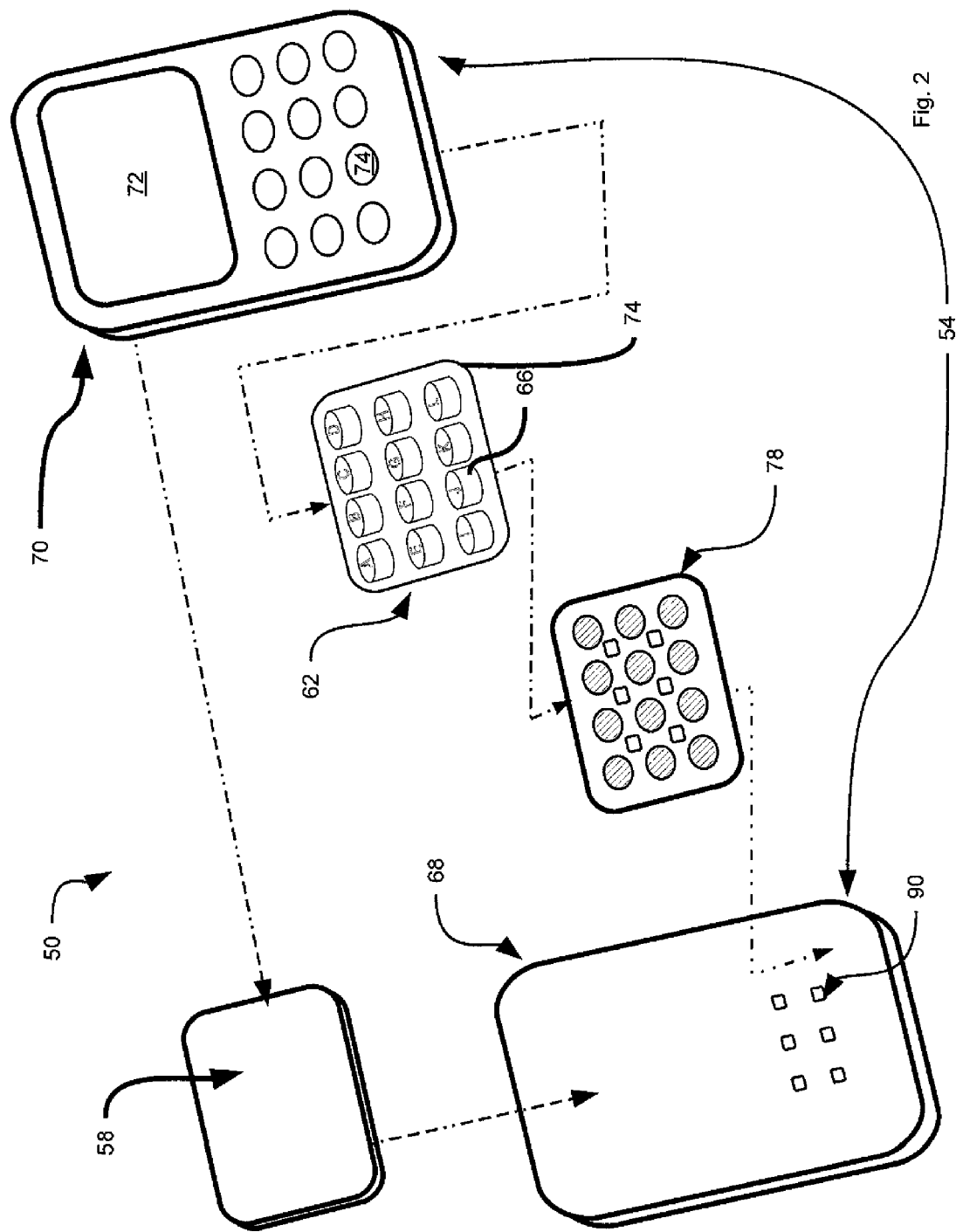
FIG. 2 is an exploded view of the portable electronic device of FIG. 1.

FIG. 2 shows an exploded view of device 50. Again, it is to be understood that the components shown in FIG. 2 are purely exemplary and that other configurations of the internal components of a particular device which utilizes a light guide as discussed herein are contemplated. FIG. 2 shows chassis 54 comprising a base 68 and a cover 70. Cover 70 is typically made from a plastic material and comprises a window 72 and a plurality of openings 74, with one opening 74 for each key 66. Cover 70 may or may not be partially translucent or transparent; but in general, window 72 may be an opening, or comprise a substantially transparent material so that information on display 58 can be presented and seen. As noted previously, light emitted from display 58 can make it difficult to discern light issuing from keyboard 62 near display 58.

As best seen in FIG. 2, display 58 is mounted to base 68, although the electrical and mechanical connections between display 58 and base 68 are not shown for ease of explanation. Base 68 also comprises a plurality of light emitters 90 which can be implemented using, for example, light emitting diodes (LED). FIG. 2 also shows a substrate 78 which is mounted to base 68, below display 58, although the mechanical connections between substrate 78 and base 68 are also omitted for ease of explanation. Substrate 78 will be discussed in greater detail below.

In a present exemplary embodiment, keyboard 62 is implemented as a continuous flexible polymeric membrane 74 with a plurality of projections therealong, each projection representing a separate key 66. The use of a continuous flexible polymeric membrane 74 may entail one or more advantages, such as advantages of cost or less susceptibility to contamination, but the concepts described herein are not limited to keyboards or other input devices that include such membranes.

When device 50 is assembled, display 58 is mounted to base 68, and substrate 78 is mounted to base 68 near display 58. Keyboard 62 is then placed over substrate 78, and finally cover 70 is disposed over display 58 and keyboard 62. Mechanical connections, such as snaps, screws, glue or other types of fasteners can be used to affix these components and attach cover 70 to base 68.

Figure 3:
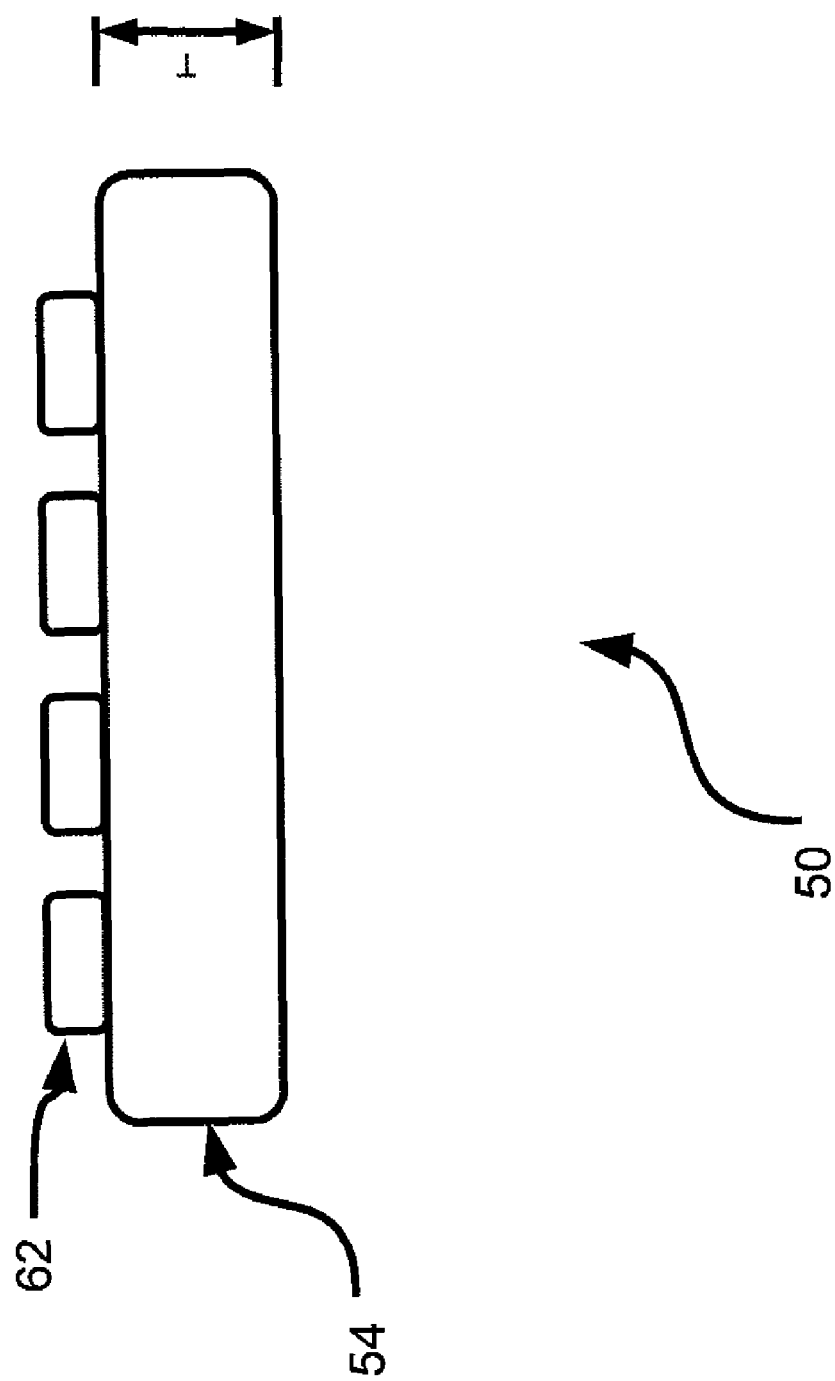
FIG. 3 is an end view of the device of FIG. 1.

Referring now to FIG. 3, an end view of device 50 is shown. As can be seen in FIG. 3, device 50 can be characterized by a thickness "T". As will be discussed further below, the light guides discussed herein can permit device 50 to be structured to have a thickness "T", that is reduced at least in relation to devices 50 that otherwise do not incorporate the light guides discussed herein.

Figure 4:
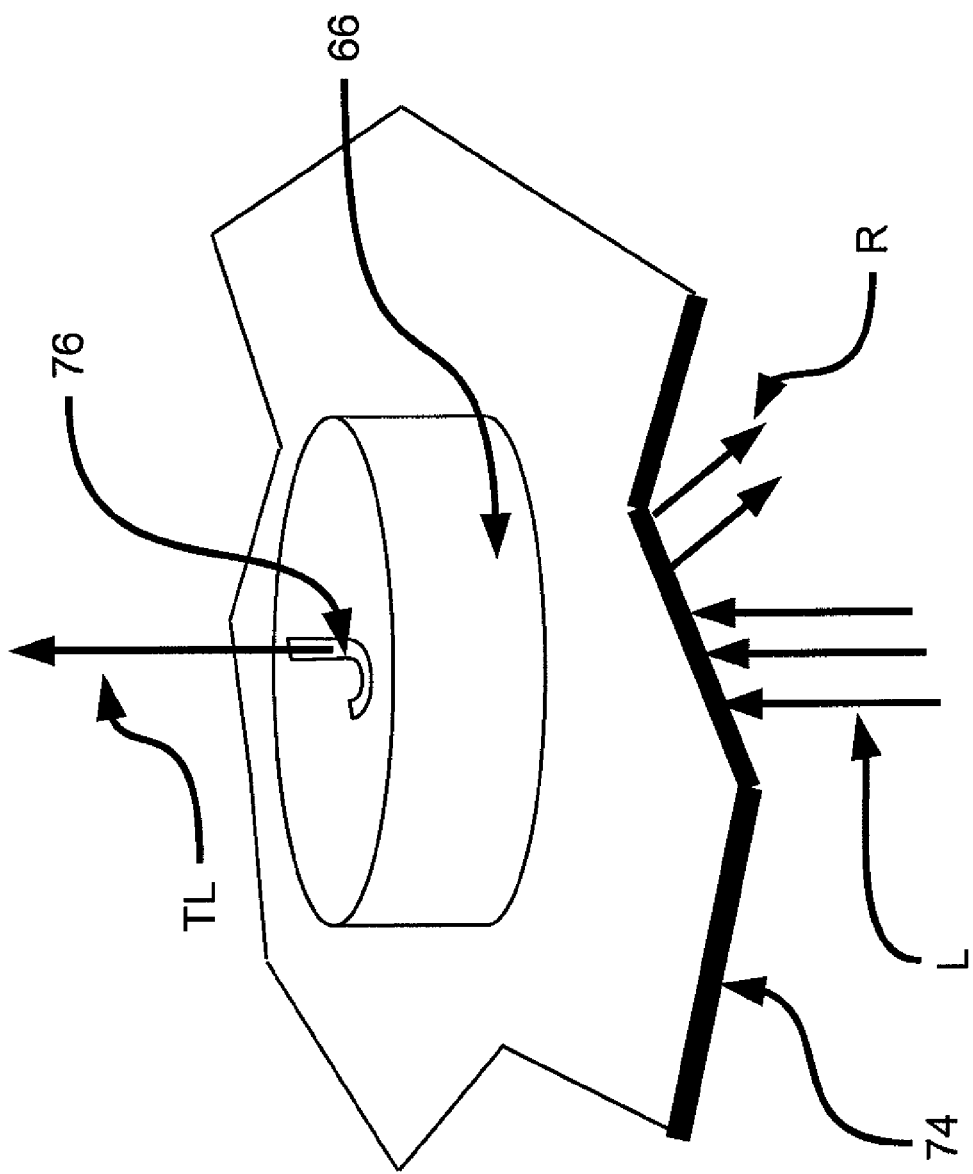
FIG. 4 shows one of the keys from FIG. 3 in greater detail.

As best seen in FIG. 4, membrane 74 is also opaque (i.e. partially transmissive or completely non-transmissive of light), except that an aperture 76 is provided for each letter (or other symbol) representing each key. In FIG. 4, aperture 76 is in the shape of the letter "J" shown on key 66. It should be understood that the exact type and shape and structure of contemplated aperture 76 is not particularly limited, and can thus include structures that are simple windows or cut-out openings (i.e. no material is provided), or apertures that can be formed from a material that is transparent, or is at least partially transmissive of light. In a present non-limiting embodiment, aperture 76 for each letter is more transmissive of light than the remainder of the structure of membrane 74. This feature is illustrated in FIG. 4, where light L from a light source (associated with a light guide, discussed further below) is shown as incident on the side of keyboard 62 that is closest to substrate 78, however, due to the opaque nature of membrane 74, only transmitted light TL actually travels through the J-shaped aperture 76 on the "J" key 66. In this manner, when light L is present, the individual letters or symbols on keyboard 62 are visible in zero or low-light conditions as transmitted light TL creates an appearance of illumination of each of the letters or symbols on each key 66. Again, note that keyboard 62, and in particular key 66 shown in FIG. 4, represents just one type of aperture contemplated. Indeed, the principles of light direction described below can be applied to the other types of apertures, whether or not associated with input devices, which are distinct from membrane 74. The underside of membrane 74 can also be provided with a white reflective layer, such that light L that does not become transmitted light TL becomes reflected light R. Reflected light R can undergo further internal reflections and eventually be emitted from another aperture from another key on keyboard 62.

Figure 5:
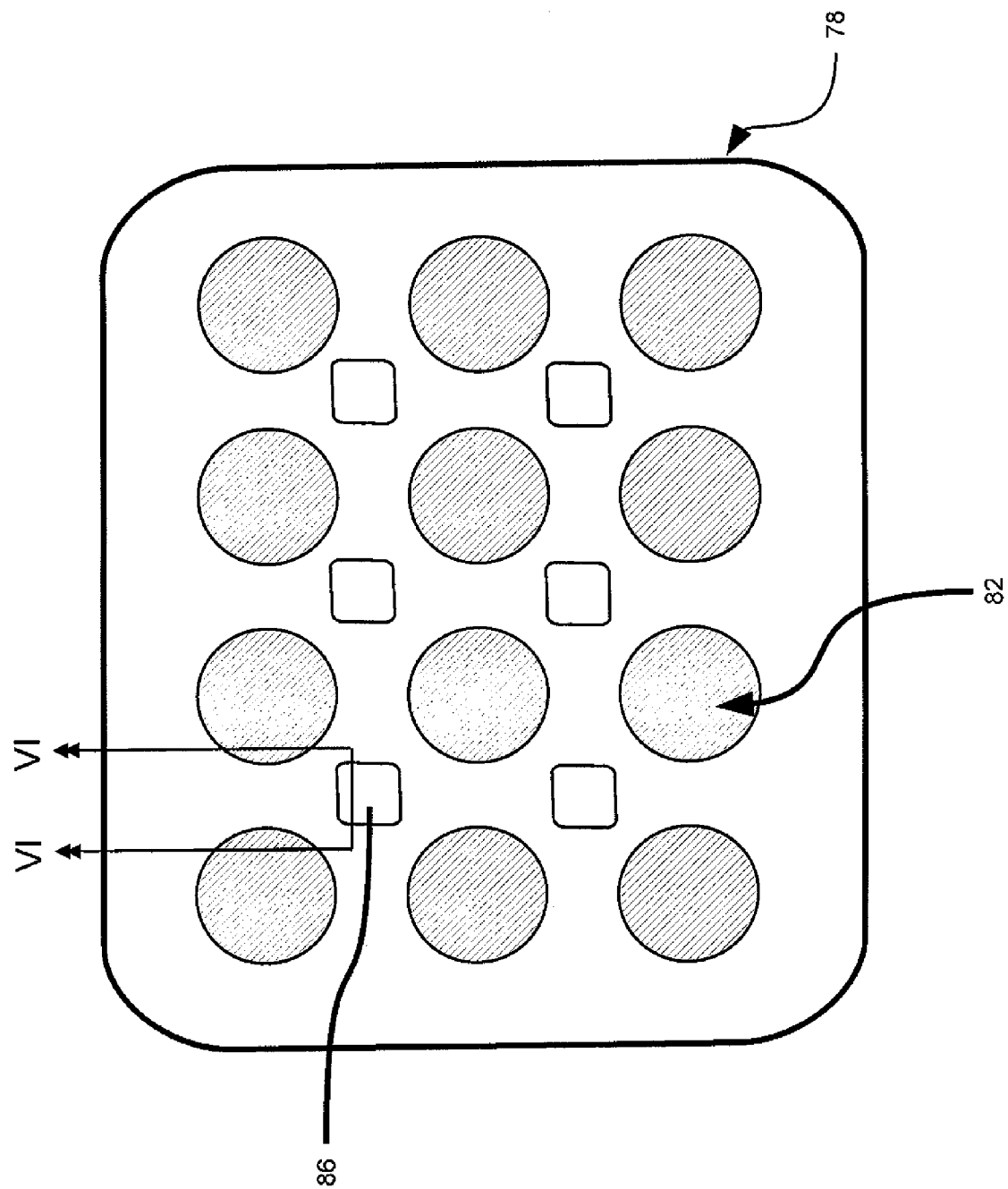
FIG. 5 is front view of the substrate from FIG. 2.

Referring now to FIG. 5, substrate 78 is shown in greater detail. FIG. 5 thus shows a plurality of locations 82 to accommodate mechanical communication between keys 66 and corresponding keyboard switches (not shown) which are typically provided on base 68. For simplicity, only one location 82 is labelled in FIG. 5, which corresponds to the key 66 shown in FIG. 4. Depressing of a key 66 results in activation of a switch within location 82 in the usual manner.

Substrate 78 comprises a plurality of light assemblies 86. Each light assembly 86 is mounted in a distributed manner across substrate 78. In the specific example of FIG. 5, six light assemblies 86 are provided, but it should be understood that the number of light assemblies is not particularly limited and can be selected according to the overall size and shape of a particular keyboard 62 or other input devices or other types of apertures which are to be illuminated. However, as will be discussed further below, the spacing between each light assembly 86, and the structure of each light assembly 86, is configured such that the amount of light emitted from each key 66 (i.e. transmitted light TL in FIG. 4), when device 50 is assembled, is substantially uniform. Expressed in other words, the amount of transmitted light TL from each aperture 76 of each key 66 will be substantially the same.

Figure 6:
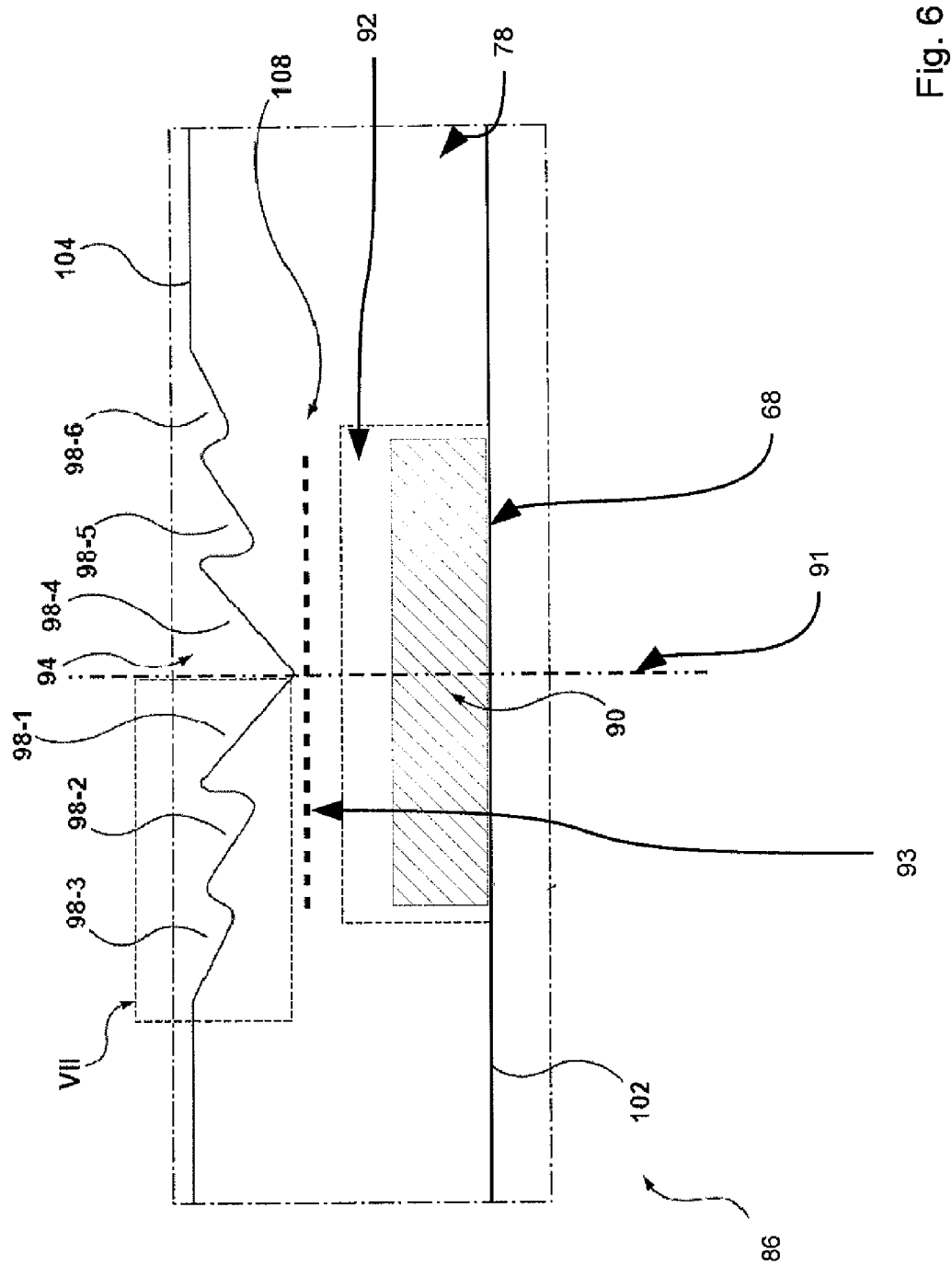
FIG. 6 is a sectional view of the substrate of FIG. 5 providing an example of a light-guide.

FIG. 6 shows a single light assembly 86 in accordance with one example of this specification. FIG. 6 shows a first surface 102 and a second surface 104 of substrate 78. Because FIG. 6 provides a sectional view, surfaces 102 and 104 appear as edges. As indicated by FIG. 6 and as described below, first surface 102 and a second surface 104 may be substantially planar but may also include physical features such that they are not strictly planar. Light assembly 86 is formed within substrate 78 and between first surface 102 and second surface 104. First surface 102 and second surface 104 thus define the thickness of substrate 78. Advantageously, substrate 78, according to exemplary embodiments herein, can have a thickness of about 1.2 millimeters thereby providing structure for reducing an overall thickness of device 50 while still providing substantially uniform lighting across keyboard 62. For convenience and subsequent reference, FIG. 6 also shows a dashed center-line 91 that passes through the center of light assembly 86 and through the center of light emitter 90. In a present embodiment, center-line 91 also happens to be normal to first surface 102 and second surface 104, but it is to be understood that in variants where first surface 102 or second surface 104 or both of them are non-planar, a conceptual center-line still exists. Similarly, FIG. 6 also shows a dashed line that represents a plane 93 normal to center-line 91.

Explaining light assembly 86 further, light assembly 86 is proximate to light emitter 90, and may be in physical contact with light emitter 90. As viewed in FIG. 6, a pocket 92 may be formed along first surface 102. Pocket 92 may be complementary in shape to light emitter 90, and may fit over a respective light emitter 90 to cover that light emitter 90 when substrate 78 is mounted to base 68. In can be noted in FIG. 6 that light emitter 90 is substantially rectangular in cross sectional shape, but other shapes are contemplated. Additionally, a light guide 94 is formed along second surface 104. FIG. 6 also shows a gap 108 between pocket 92 and light guide 94. In a present, non-limiting embodiment, substrate 78 is a solid material and therefore gap 108 is also formed from that solid material. In a present embodiment substrate 78 is either transparent, or substantially transparent, polycarbonate or poly (methyl methacrylate) (PMMA). Accordingly, gap 108 will have an index of refraction, and those skilled in the art will now recognize that light guide 94 can be configured so as to consider any effects of that index of refraction associated with gap 108. For example, polycarbonate has an index of refraction of about 1.59 while PMMA has an index of refraction of about 1.49. Likewise, light guides 94 can be implemented to account for refraction resulting from air (or vacuum or material) within pocket 92 that exists between light emitter 90 and gap 108. In the present embodiment, center-line 91 passes through the center of both light guide 94 and light emitter 90, but, as will be explained in relation to subsequent embodiments, the center of light guide 94 can be placed off-center from light emitter 90.

It should now be noted that substrate 78 and light assemblies 86 can be formed using various manufacturing processes, including injection molding. The various possible materials for substrate 78 can also be chosen for ease of manufacture depending on the selected manufacturing process.

It should now be understood that, while in the present embodiment substrate 78 is a solid material, and light guide 94 and pocket 92 are formed along edges of that solid material, an inverse structure is also contemplated, whereby, for example, gap 108 is a vacuum (or air or other gas), and light guide 94 itself formed from a solid material.

Figure 7:
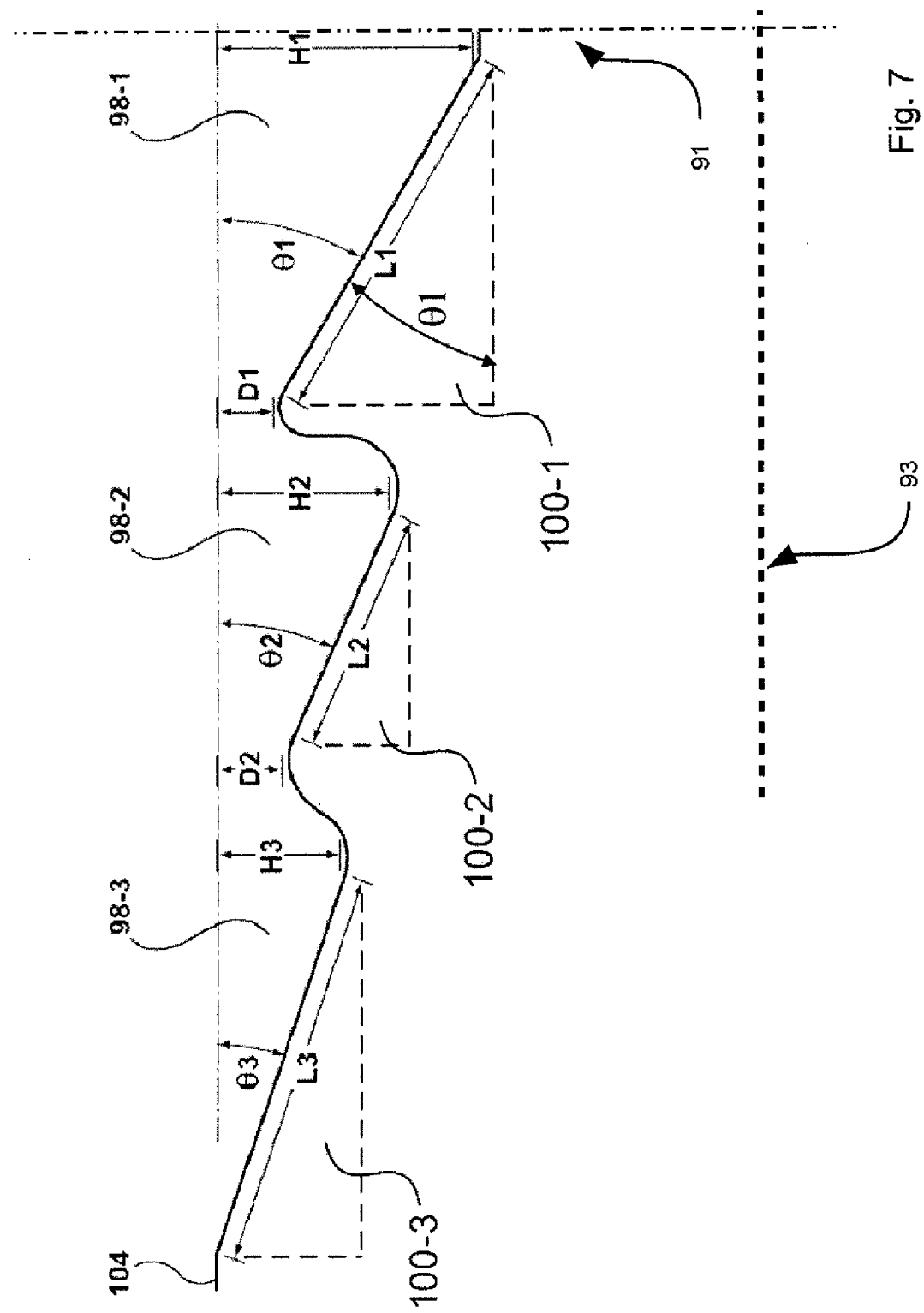
FIG. 7 shows a detail of a portion of the light-guide shown in FIG. 6.

Light guide 94 comprises a plurality of reflective prisms 98. In the specific example of FIG. 6, there are six prisms 98-1, 98-2, 98-3, 98-4, 98-5 and 98-6. Light guide 94 is a symmetric structure, whereby prisms 98-1, 98-2 and 98-3 are a mirror-image of prisms 98-4, 98-5 and 98-6. In general prisms 98 are elements that refract light (and may also transmit or reflect light, depending on the shape of the prism and the path of light through the prism). Expressed differently, prisms 98 change the direction of rays of emitted light EL from light emitter 90. Prisms 98 may have, but do not necessarily have, one or more planar faces. Prisms 98 include one or more boundaries, which represent the transition from one medium to another. For example, prism 98 may have one or more boundaries that transition from PMMA to air.

face 104 and a first corner of triangle 100-1. Distance D1 represents the perpendicular distance between the plane of the second edge 104 and a second corner of triangle 100-1. Distance L1 represents the length of the hypotenuse of triangle 100-1, the hypotenuse generally being a boundary (or part of a boundary) of the prism 98-1. Angle Θ1 represents the angle formed by the hypotenuse of triangle 100-1 and the plane of the plane of the second surface 104. Angle Θ1 also represents the angle formed by the hypotenuse of triangle 100-1 and plane 93. In a similar fashion, prism 98-2 has a substantially triangular cross-sectional shape and may be defined by a height H2, a length L2, a distance D2, and an angle Θ2. Prism 98-3 also has a substantially triangular cross-sectional shape and may be defined by a height H3, a length L3, and an angle Θ3. No distance D3 is shown in FIG. 7 because the perpendicular distance between the plane of the second edge 104 and a respective corner of triangle 100-3 is zero, but this specification contemplates that any cross-sectional triangle may have any value D, including a negative value whereby a prism 98 extends beyond second surface 104. The selection of H, L, D and Θ is for purposes of convenience. As a matter of geometry and trigonometry, the shapes of the prisms could also be equivalently described with respect to other lengths or angles. As depicted in FIG. 7, the triangular cross-sections 100 of prisms 98 are proximate to one another, but the concept described herein is not limited to the distances from one prism to another. Table I shows certain possible ranges for each dimension for each prism 98. The dimensions in FIG. 7 and Table I can also apply to the mirror-image prisms 98-4, 98-5 and 98-6.

TABLE I

Possible Ranges of Dimension for Prisms 98

| Prism | Height H | Tolerance for Height H | Distance D | Tolerance For Distance D | Length L | Tolerance for Length L | Angle Θ | Tolerance for Angle Θ |
|---|---|---|---|---|---|---|---|---|
| 98-1 | about 0.3 mm | about +/− 10% | about 0.5 mm | about +/− 10% | about 0.5 mm | about +/− 10% | Θ1 = about 40° | about +/− 10° |
| 98-2 | about 0.2 mm | about +/− 10% | about 0.25 mm | about +/− 10% | about 0.25 mm | about +/− 10% | Θ2 = about 20° | about +/− 10° |
| 98-3 | about 0.2 mm | about +/− 10% | about 0.25 mm | about +/− 10% | about 0.25 mm | about +/− 10% | Θ3 = about 5° | about +10° or about −5° |

Figure 8:
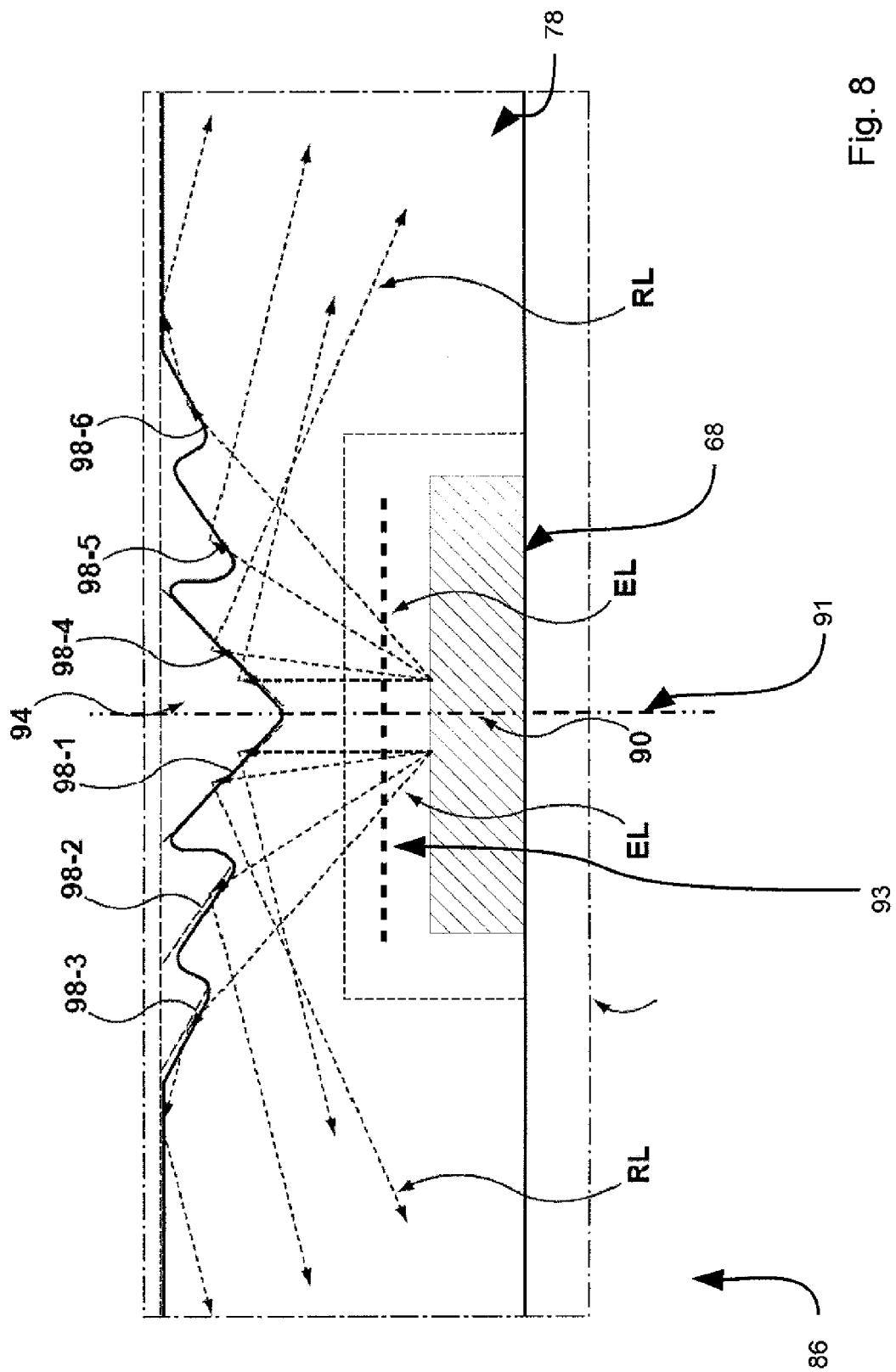
FIG. 8 shows the light-guide of FIG. 6 with the light emitter emitting light.
Figure 9:
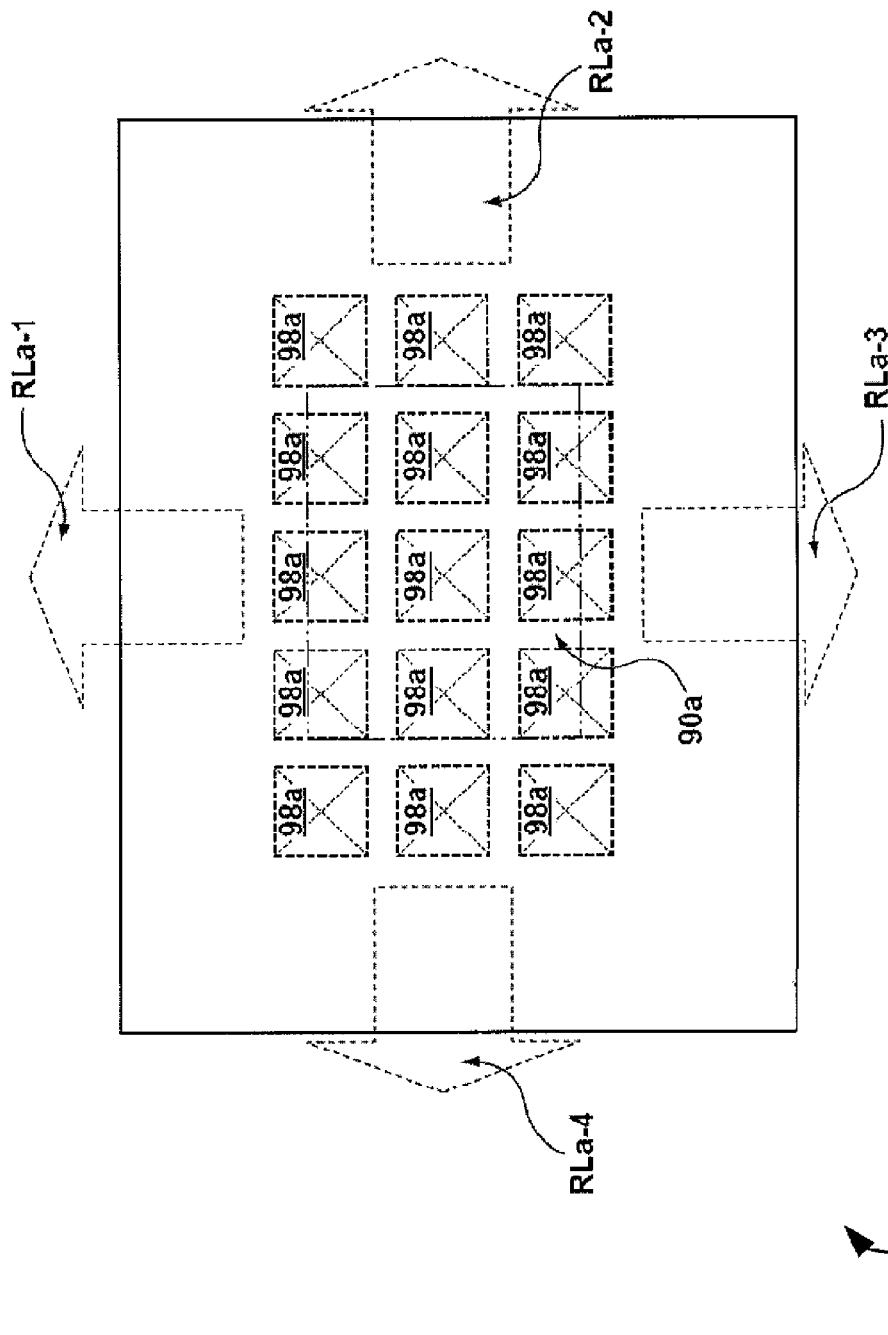
FIG. 9 shows a top view of a light assembly in accordance with another non-limiting example.

FIG. 7 shows prisms 98-1, 98-2 and 98-3 in greater detail, and those skilled in the art will now recognize that the detail in FIG. 7 likewise applies to prisms 98-4, 98-5 and 98-6. For the present, non-limiting exemplary embodiment, prisms 98-1, 98-2 and 98-3 are defined according to certain dimensions as illustrated in FIG. 7. As viewed in FIG. 7, each prism 98 is substantially triangular in cross-sectional shape, and to help further illustrate each prism 98, a cross-sectional triangle 100 is provided in dashed lines and which is complementary to the substantially triangular shape of each prism 98. More specifically, as viewed in FIG. 7, prism 98-1 is substantially triangular in cross-sectional shape and can be defined by a height H1, a length L1, a distance D1, and an angle Θ1. One side of the cross-sectional triangle 100-1 is substantially parallel to the plane of the second surface 104 and another side of the cross-sectional triangle 100-1 is substantially perpendicular to the plane of the second surface 104, making triangle 100-1 a right-angled triangle. As shown by FIG. 7, prism 98-1 is substantially triangular in cross-sectional shape in that one or more corners of the substantially triangular cross-sections may be rounded rather than sharp. Height H1 represents the perpendicular distance between the plane of the second sur- Referring now to FIG. 8, when light emitter 90 is active, light emitter 90 emits light EL from an emitting surface of light emitter 90. In a present embodiment the emitting surface of light emitter 90 is substantially planar and parallel to plane 93. Where light emitter 90 has an emitting surface with a shape different from that shown in FIG. 8, including an irregular, rounded, or otherwise non-planar emitting surface, such a light emitter can be described as having a tangent plane from which light is emitted, that tangent plane being substantially parallel to plane 93 and substantially perpendicular to center-line 91. An idealized representation of the scattered emitted light EL is shown in FIG. 8. Emitted light EL will in turn, become incident on various prisms 98, and commonly incident on given boundary of a given prism 98, leading to a plurality of reflections, idealized representations of which are shown in FIG. 9 as reflected light RL. Reflected light RL, in turn, will undergo further reflections against substrate 78 to (for example) generate light L as shown in FIG. 4, leading to transmitted light TL through the aperture 76 of each key 66.

As a variation of the embodiment in FIG. 8, not shown, light guide 94 can be partially transmissive, such that some of the emitted light EL is actually emitted from second surface 104. In this variation, the emitted light EL from second surface 104 of light assembly 86 can be used, for example, as a backlight, although in an electronic device having a different structure than portable electronic device 50.

It can be noted from FIG. 7 and Table I that prism 98-1, the prism 98 nearest the center of light emitter 90 has the largest angle Θ and that prism 98-3, the prism 98 that is farthest from the center of light emitter 90 has the smallest angle Θ. In general, angle Θ decreases for each prism that is farther away from the center of light emitter 90. Indeed, light guide 94 can include any number "n" of prisms 98, where "n" is greater than one. Furthermore, the angle Θ for each prism 98 can be any angle ranging from about one degree to about eighty degrees, where the angle Θ for each prism 98 becomes progressively smaller according to the distance of a given prism 98 from the center of light emitter 90. As rays of light are emitted in various directions from the light emitter 90, some rays may be transmitted, and others may be reflected (and thereby scattered), depending upon each ray's path in the prisms. The angles can be selected to produce any degree of scattering. In general, the prism 98 that is closest to the center of the light emitter 90 has the largest angle Θ to produce a desired degree of scattering, and those prisms 98 further from the center of the light emitter 90 can produce substantially the same degree of scattering with smaller angles Θ.

As noted above, those skilled in the art will now appreciate that the dimensions in FIG. 7 and Table I may also apply to the mirror-image prisms 98-4, 98-5 and 98-6. It is to be reemphasized that the foregoing is purely an example. In other example embodiments, other numbers of prisms 98 can be provided, or only some mirror-image prisms can be provided, or no mirror-image prisms may be provided.

It can also be noted that FIG. 6, FIG. 7, and FIG. 8 show only a cross-section of a light assembly 86 in one plane, but the geometry of light guide 94 can be the same or different in different cross-section planes. Indeed, light guide 94 can be configured according to different three-dimensional shapes, including, for example, using a pyramid for each prism 98. Pyramid shapes having different numbers of sides are contemplated, including tetrahedrons, square pyramid and pentagonal pyramids. (Another example shape is discussed further below in relation to FIG. 11.)

FIG. 9 provides another example embodiment, which shows a top view of a light assembly 86a that is based on light assembly 86, and therefore like elements bear like references except followed by the suffix "a". In light assembly 86a, fifteen prisms 98a are provided which are structured to generate reflected light RLa in four directions all away from light emitter 90a, as shown in FIG. 9. Again, the prism 98a closest to the center of light emitter 90a is the largest in size, and the other prisms 98a become progressively smaller in size in proportion to their distance from the center of light emitter 90a, to thereby generate reflected RLa. In the embodiment of FIG. 9, each prism 98a is a four-sided pyramid in shape and prisms 98a are arranged in a grid. To illustrate further possible variations, in FIG. 9, the center of the grid of prisms 98 is offset from the center of light emitter 90a, such that more light is directed along arrow RLa-2, and less light directed along arrow RLa-4. It should be understood that light emitter 90a can also be centered in relation the grid of prisms 98, or offset in other positions.

Figure 10:
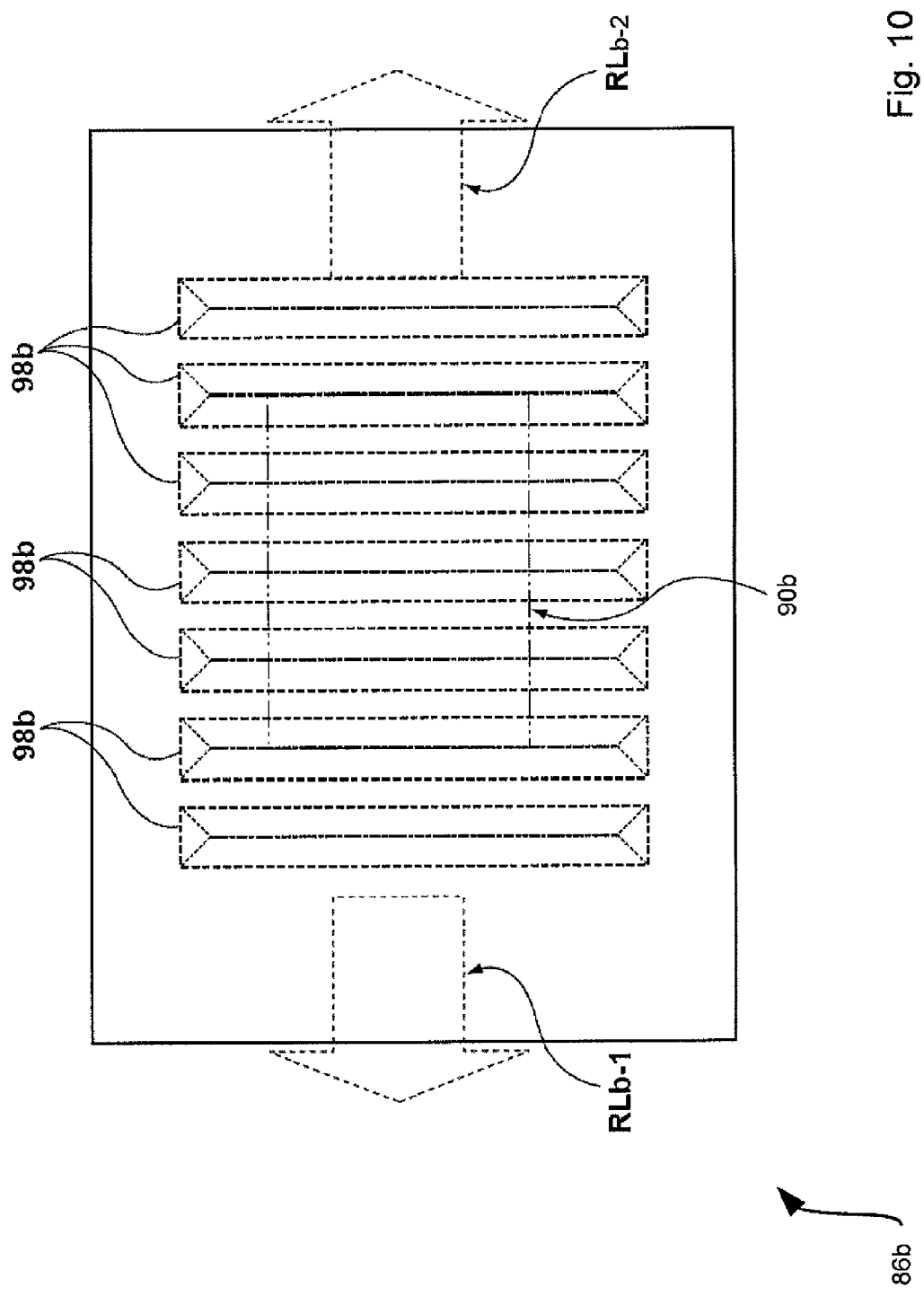
FIG. 10 shows another top view of a light assembly in accordance with another non-limiting example.

Furthermore, prisms 98a of light assemblies 86a can be configured to only generate reflected light reflected light RLa-2 and RLa-4; or to generate reflected light RLa-1 and reflected light RLa-3. FIG. 10 provides another example embodiment, which shows a top view of a light assembly 86b that is based on light assembly 86, and therefore like elements bear like references except followed by the suffix "b". In light assembly 86b, seven prisms 98b are provided which are structured to generate reflected light RLb in two directions all away from light emitter 90b, as shown in FIG. 10. As can be seen in FIG. 10, each prism 98b is four-sided, but with each pair of sides having different lengths, where the longest pair of sides direct the majority of light RLb. Again, the prism(s) 98b closest to light emitter 90b is(are) the largest in size, and the prisms 98b become progressively smaller in size in proportion to their distance from light emitter 90b, to thereby generate reflected RLb. Each prism 98b is substantially rectangular and arranged in parallel with each other. Light assembly 86b generates reflected light RLb in two directions.

Figure 11:
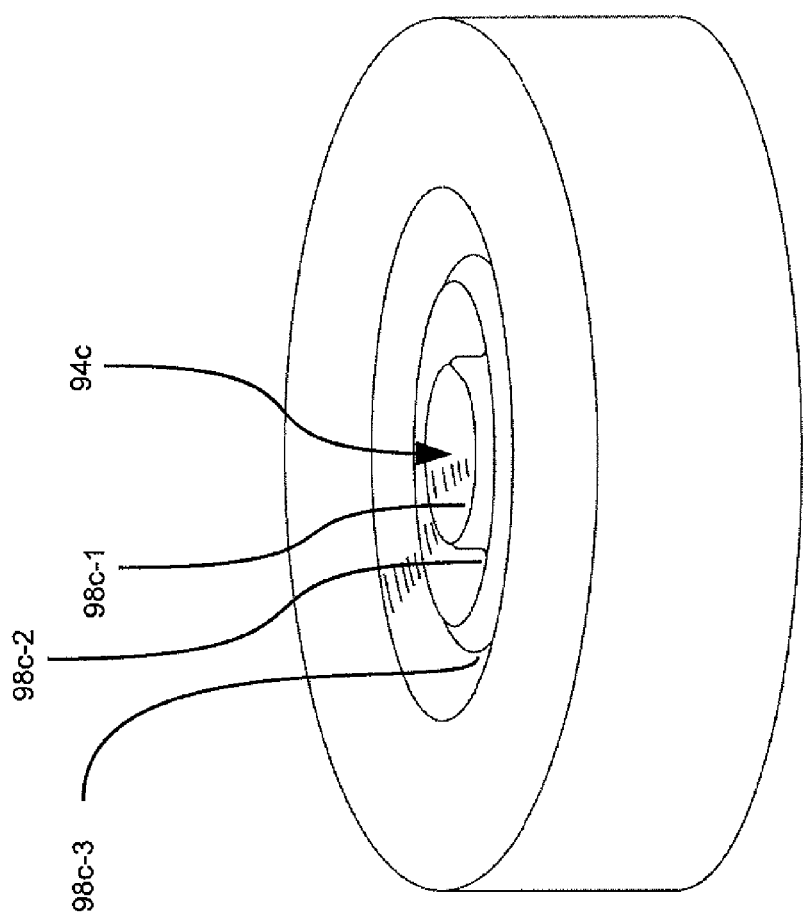
FIG. 11 shows an example of a three-dimensional perspective view of a light-guide.

It is also to be reemphasized that prisms 98 can be configured in different shapes. For example, another variation is shown in FIG. 11, with a light guide 94c which can comprise a central conical prism 98c-1 surrounded by concentric annular prisms 98c-2 and 98c-3. Those skilled in the art now will recognize that light guide 94c has a cross-section as shown in FIG. 7. Of note is that the shape in FIG. 11 can be expected to result in substantially omni-directional reflections.

Figure 12:
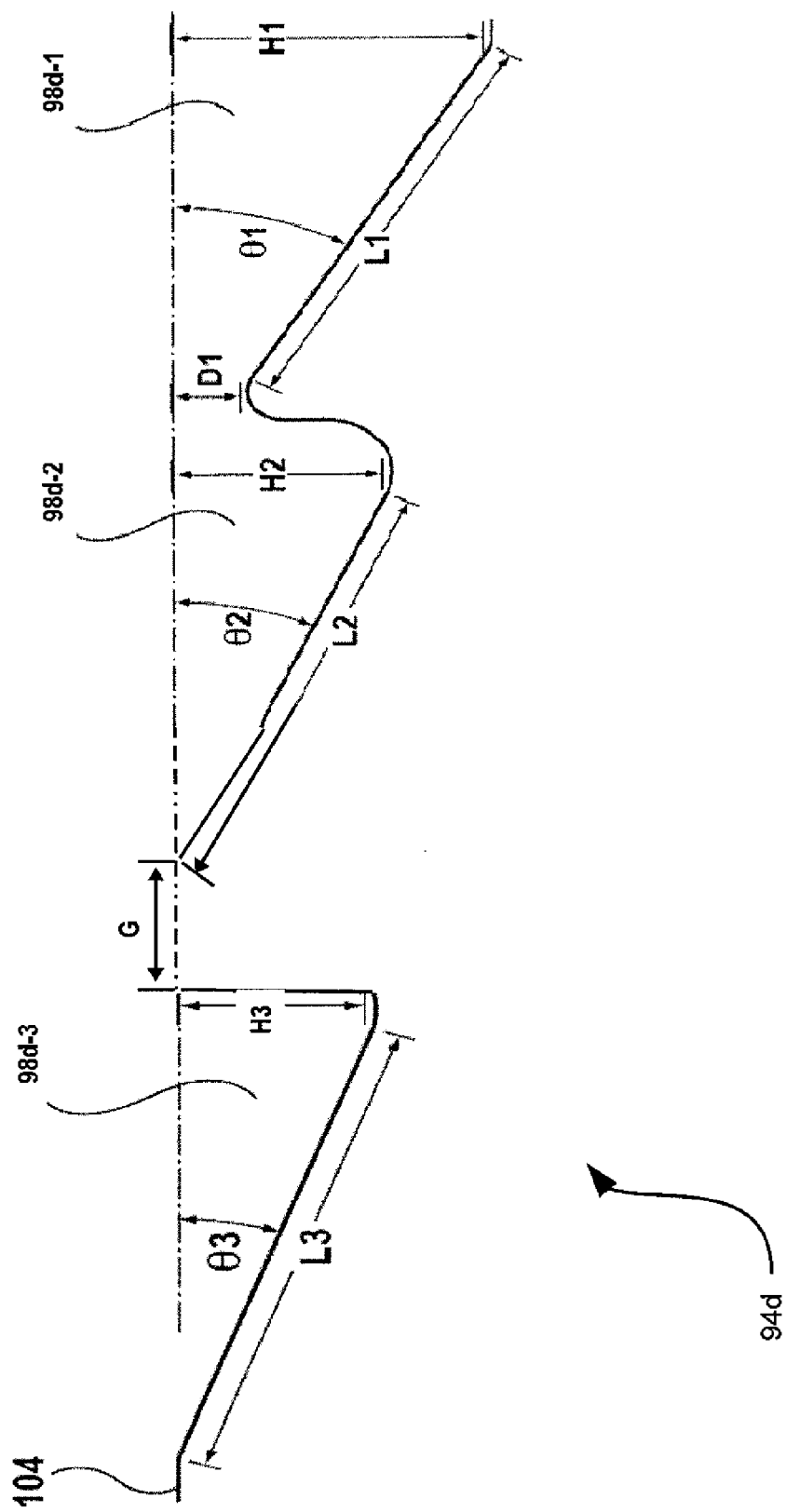
FIG. 12 shows an example of a variation of a sectional view of a light-guide providing a pitch between adjacent prisms.

Other variations are also contemplated. For example, while FIG. 7 and Table I show a particular exemplary configuration for light guide 94, still further configurations are contemplated. One such further configuration includes the option of spacing one or more prisms 98 apart from each other. This configuration is shown in FIG. 12, where a further light guide 94d is shown. In FIG. 12, light guide 94d is substantially the same as light guide 94, except that prism 98d-3 is spaced a distance G apart from prism 98d-2. The distance G is measured along second surface 104, and reflects the distance between the point where the length L2 of prism 98d-2 joins with second surface 104, and the point where height H3 of prism 98d-3 joins with second surface 104. It is contemplated that G can be in a range of about zero millimeters to about ten millimeters. Furthermore, the distance G can be applied to any adjacent sets of prisms 98d. For example, the distance G can be applied to the spacing between prism 98d-1 and prism 98d-2. Or, the distance G can be applied to the spacing between any additional prisms that are included beyond prism 98d-3.

Various advantages are afforded by this specification. For example, it can be possible to configure a device 50 having a thickness T (as shown in FIG. 3) that is smaller than could be configured without the benefit of this specification. Furthermore, in certain manufacturing processes it is simpler to create tooling to form substrate 78 rather than applying a reflective coating to the underside of a keyboard 62 or equivalent structure.

While certain specific embodiments have been discussed herein, combinations, subsets and variations of those embodiments are contemplated. It is the claims attached hereto that define the scope of time-limited exclusive privilege of this specification.

The invention claimed is:

1. A light guide configured for positioning proximate to a light emitter in an electronic device; said light guide comprising:

a first prism having a first position in relation to said light emitter; said first prism having a first boundary defined by a first length and a first angle in relation to a plane parallel to a surface of said light emitter; and, a second prism having a second position in relation to said light emitter; said second prism having a second boundary defined by a second length and a second angle in relation to said plane; and a plurality of additional prisms; each of said prisms being substantially square in shape, arranged in a grid; each of said additional prisms having surfaces defined by additional lengths and additional angles in relation to said plane, each decreasing in size according to a distance from said light emitter;

wherein said first position is closer to said light emitter than said second position and said second angle is less than said first angle.

2. The light guide of claim 1 wherein said first angle is between about one degree and about eighty degrees.

3. The light guide of claim 1 wherein said first angle is about forty degrees.

4. The light guide of claim 1 wherein said first angle is between about thirty degrees and about fifty degrees.

5. The light guide of claim 1 wherein said second angle is between about one degree and about eighty degrees.

6. The light guide of claim 1 wherein said second angle is about twenty degrees.

7. The light guide of claim 1 wherein said second angle is between about ten degrees and about thirty degrees.

8. The light guide of claim 1 wherein said second angle is different than said first angle.

9. The light guide of claim 1 wherein at least one of said prisms is a pyramid shape.

10. The light guide of claim 9 wherein said pyramid shape is one of a tetrahedron, a square pyramid, and a pentagonal pyramid.

11. The light guide of claim 9 wherein said pyramid shape has two pairs of sides; each said side in each said pair being of the same length; each of said pairs having different lengths.

12. The light guide of claim 1 wherein said first position centers said first prism in relation to said light emitter.

13. The light guide of claim 1 wherein said first position places said first prism off center in relation to said light emitter.

14. An electronic device comprising:
a light emitter;
a first prism having a first position in relation to said light emitter; said first prism having a first surface boundary defined by a first length and a first angle in relation to emitted light from a plane parallel to a surface of said light emitter; said first prism configured to reflect at least a portion of said emitted light away from said first surface; and,
a second prism having a second position in relation to said light emitter; said second prism having a second boundary defined by a second length and a second angle in relation to said plane;
wherein said first position is closer to said light emitter than said second position and said second angle is less than said first angle,
an aperture proximate to said light emitter for transmitting light that is reflected from said first prism and said second prism.

15. The electronic device of claim 14 wherein said aperture is disposed on a key of a keyboard.

16. The electronic device of claim 14 wherein said aperture is configured for illuminating a surface of said electronic device and said device one of a cellular telephone, a handheld remote control unit, a garage door opener, a portable email paging device, a camera, a portable music player, a portable video player, a portable video game player, a handheld global positioning system (GPS) device, a keyboard for a desktop computers, a video game control pad.

17. The electronic device of claim 14 wherein said aperture is configured for a backlight of a display on said electronic device.

18. The electronic device of claim 14, further comprising a plurality of additional prisms; each of said prisms being substantially square in shape, arranged in a grid; each of said additional prisms having surfaces defined by additional lengths and additional angles in relation to said plane, each decreasing in size according to a distance from said light emitter.

* * * * *